Jan. 17, 1950

C. J. MELLODGE 2,495,070

FASTENER HANDLING DEVICE

Filed Feb. 27, 1945

INVENTOR.
Charles J. Mellodge
BY
Donald W. Farrington
ATTORNEY

INVENTOR.
Charles J. Mellodge
BY
Donald W. Farrington
ATTORNEY

Patented Jan. 17, 1950

2,495,070

UNITED STATES PATENT OFFICE 2,495,070

FASTENER HANDLING DEVICE

Charles J. Mellodge, Baltimore, Md., assignor to The Glenn L. Martin Company, Middle River, Md., a corporation of Maryland Application February 27, 1945, Serial No. 580,038

6 Claims. (Cl. 78—48)

My invention relates to a fastener handling device, and more particularly to a device for the positioning or feeding of headed fasteners.

One of the principal problems involved in the use of automatic fastening tools is the rapid and automatic supply of fasteners to the working parts of the tools. Thus, in the large number of industries where the riveting of metals is involved one of the most difficult problems yet unsolved is the quick and easy handling of the rivets. These objects are so small as to render them difficult of practical manual manipulation. It is customary in many cases to pre-cool the rivets; this practice, too, calls for a ready, quick and sure method of automatic positioning of rivets whereby manual handling may be eliminated. Similarly, in automatic nailing machines and the like it is essential that there be a rapid and continuous supply of nails and tacks to the machines.

It is an object of my invention to provide a fully automatic means of feeding headed fasteners by whirling a number of such fasteners in a circular path by means of an air stream and discharging the fasteners into tracks whereby they will be carried to the desired location.

It is a further object of my invention to provide a fully automatic means of positioning headed fasteners by whirling them in a circular path and forcing them, shank first, through an outlet into a guide adapted to carry them in a predetermined position.

It is my further purpose to provide an inexpensive, simple means for the positioning or feeding of headed fasteners in a device which requires no moving parts, is easy to assemble and operate, and which is rapid and sure in its performance.

It is a further object of my invention to provide a fastener handling device to be mounted on a rivet gun or similar automatic working tool.

It is a further object of my invention to provide a rivet gun or the like having an automatic positioning means mounted thereon and guide means to carry the fasteners from the automatic positioning means to the point at which they will be acted upon by the gun.

It is a further object of my invention to provide a rivet tool or the like having an automatic positioning means, guide means leading from the positioning means, and automatic means for regulating the movement of the fasteners into the path of the riveting tool.

These and other objects and advantages of my invention will appear in the following description and in the drawings wherein.

Figure 7:
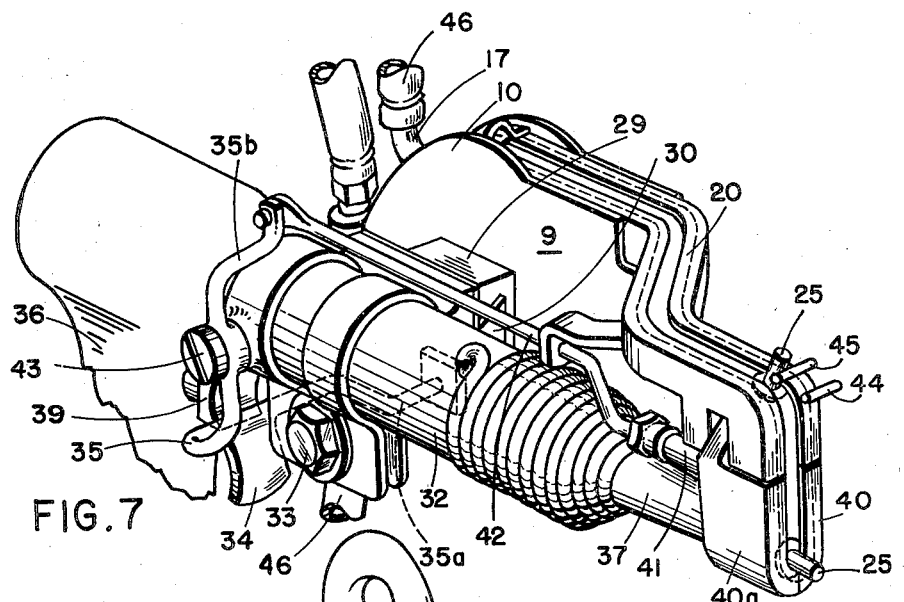
Figure 8:
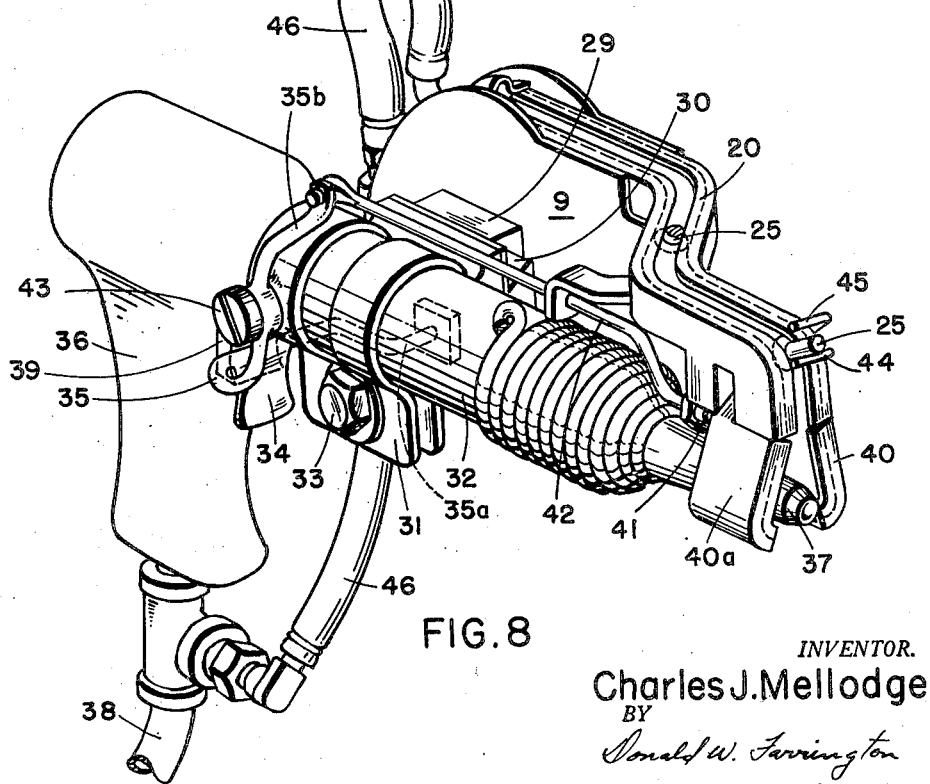

Fig. 7 is a fragmentary perspective view of a rivet gun on which is mounted my fastener handling device and which has a rivet track, leading from the fastener supply device to the operative end of the gun where the track includes a hinged section, the hinged track here being shown in its closed position; and Fig. 8 is a perspective view of the rivet gun of Fig. 7 with the hinged track being shown in its opened position.

In the following description my device will be described, for purposes of convenience, as a rivet positioning or feeding device and the gun on which it may be mounted will be described as a rivet gun. It will be understood at all times, however, that my invention is capable of use in other ways and in connection with other types of headed fasteners, and the following description will be treated as illustrative only.

A substantially round reservoir 9 comprises a base 10, a wall 11 extending about the periphery of the base, and a cover 12 parallel to the base 10. I have here shown the cover as made of a transparent plastic material, thereby permitting observation of the apparatus in action, and making it possible to replenish the supply of rivets kept in the reservoir before it is exhausted. A cover fastening boss having a circular wall 13 concentric with the wall 11 projects centrally from the base 10. The wall 13 carries a pair of opposed, inwardly extending pins 14 which serve as catches to engage a pair of depending spring fingers 15 mounted on the inside of the cover 12 to permit the easy securing and removing of the cover.

In one side of the wall 11 is an air inlet 16 to which is secured an exteriorly extending tube 17 adapted to be attached to an air pressure source.

Figure 4:
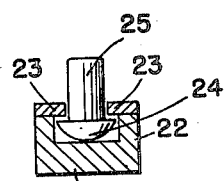
Fig. 4 is a sectional view of the track taken on plane 4—4 of Fig. 1.
Figure 5:
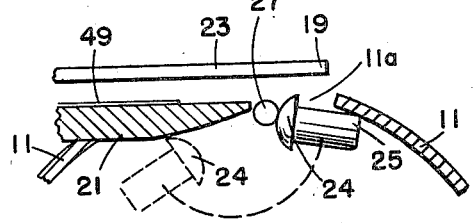
Fig. 5 is an enlarged detail showing the operation of my fastener handling device in precluding a rivet from passing out of the reservoir head first.
Figure 6:
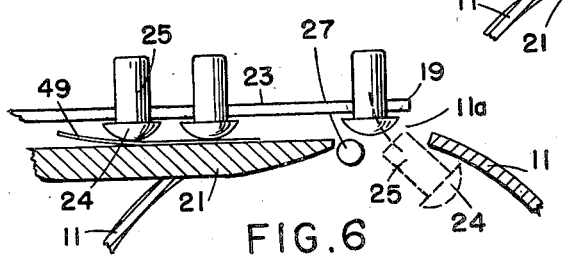
Fig. 6 is an enlarged detail showing the operation of my fastener handling device in permitting the passage of a fastener out of the reservoir shank first.

A port 11a of several degrees is formed in the wall at a point a short distance from the air inlet 16. This port is partially closed by the spaced end flanges 19 of a rivet track 20 which is secured to the wall 11 at the port. The track 20 comprises a base 21, sides 22 extending from said base, and flanges 23 carried by the side parallel to the base 21 (see Fig. 4). The track base is open at the port 11a and is thereby adapted to receive the head 24 of a rivet in the channel formed by the base and sides, and to receive the shaft 25 of the rivet between the flanges 23. As shown in Fig. 6, the above described arrangement is such that the end flanges 19 of the track over-hang the port 11a so that this portion of the track may receive a rivet shank end first. A pin 27 extends from the base 10 parallel to the wall 11 at a point adjacent the opening 11a to serve as a guide to rivets properly positioned and as a barrier to rivets improperly positioned with respect to the track.

Figure 1:
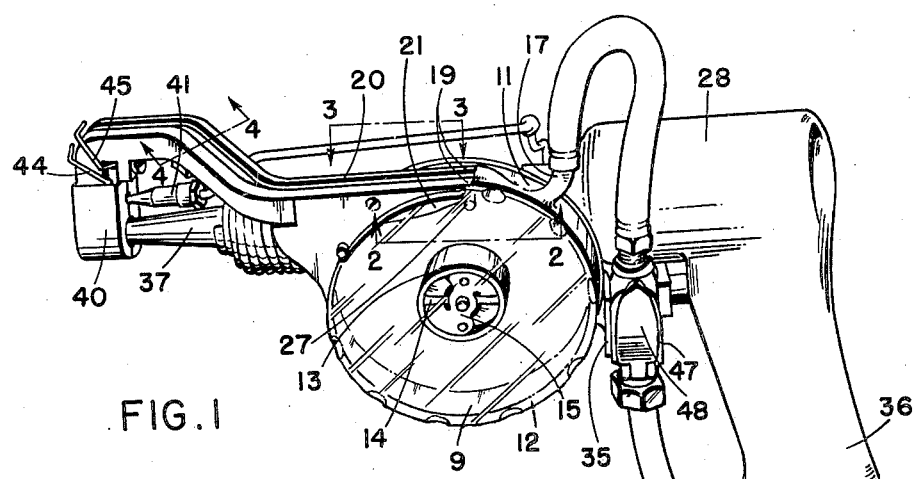
Figure 1 is a perspective view of my fastener handling device mounted on a rivet gun.
Figure 2:
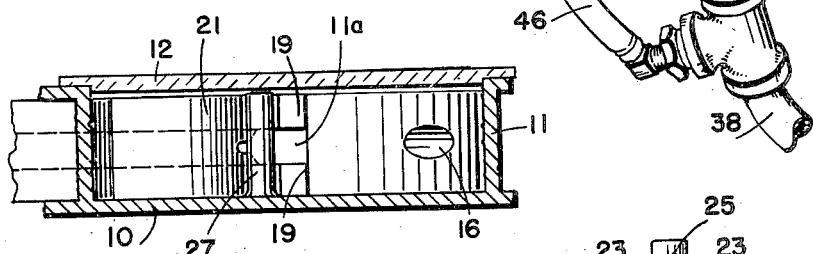
Fig. 2 is an enlarged sectional view taken on plane 2—2 of Fig. 1.
Figure 3:
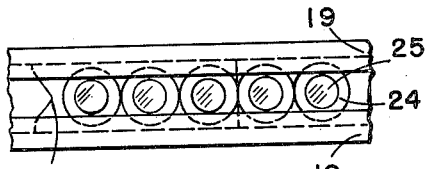
Fig. 3 is a partial plan view of the track taken as indicated at 3—3 of Fig. 1.

My fastener positioning or feeding device may be used for different types of headed fasteners. One example of its use is shown in Figs. 1, 7 and 8 where it is shown as mounted on a rivet gun 28. I have here shown the reservoir 9 provided with a tongue and groove mount on the base 10. The grooved member 29 is adapted to slidably engage a tongue 30 which is secured to a clamp 31 mounted on the barrel 32 of the gun as by a bolt 33. An operating member 34 comprises a portion 35 extending beneath the gun and connected to the base 10 of the reservoir as at 35a so that when the lever is forced toward the handle 36 of the gun the reservoir is pulled in the same direction, the grooved member 29 sliding along the tongue 30, withdrawing the rivet track from possible contact with a work piece during the rivet hammering period of operation.

The end of the barrel 32 of the gun is provided with a hammer 37 adapted to act upon the rivets when actuated as by air pressure. Air is received in the gun through a pipe 38 connected by any conventional means to the base of the handle 36 of the gun. The hammer actuation results from pressure upon the trigger 39 which is positioned directly behind the member 34. In this embodiment of the invention the rivet track 20 is curved to carry the rivets from the reservoir to a point adjacent the end of the hammer 37. At its end the rivet track comprises two hinged track sections 40 and 40a which surround the end of the hammer 37 when it is in its normal position. A wedge 41 is positioned posteriorly of the hinged track sections 40 and 40a and is carried at the end of a rod 42, pivotally connected to that portion 35b of the operating member 34 above the pivot 43. Thus, when the member 34 is moved toward the handle 36 of the rivet gun the rod 35 is carried clockwise below the pivot 43 thereby urging that portion 35b above the pivot 43 away from the handle. Thus, the rod 42 is forced toward the forward end of the rivet gun and the wedge 41 is inserted between the hinged track sections 40 and 40a thereby separating these sections to release the head of the rivet guided to the end of the track. As the member 34 is moved toward the handle 36 it actuates the trigger 39 thereby driving the rivet released by track separation.

I have also provided a means of regulating the passage of the rivets into the path of the hammer 37 by a pair of escapement fingers 44 and 45. The finger 45 is secured at one end to the top of the hinged track section 40a while the finger 44 is secured to the top of the hinged track section 40. The free ends of the fingers 44 and 45 are formed parallel to but slightly spaced from the top of the guide channel 23 of the rivet track. When the hinged track sections 40 and 40a are in their closed position the finger 45 extends across the center path of the guide 23 so that no rivet moving down the track 20 may pass that point. As the lever 34 is actuated, however, and the hinged track sections are separated the finger 45 is pulled back and the finger 44 extends across the channel, so that the rivet which previously had been stopped by finger 45 would move on to meet and be stopped by the finger 44. When the lever 34 has again moved away from the handle 36 of the gun, the fingers then assume their alternative position. The finger 44 then retreats from the path so that the single rivet thus released will drop to a point immediately in front of the hammer 37 there to be actuated upon as above described.

To actuate my fastener positioning device I have tapped air pressure from the main supply pipe 38 through a hose 46 which is connected to the tube 17 leading into the reservoir 9. If desired, this supply of air pressure may be independently controlled as by a valve 47 controlled by a handle 48.

A suitable number of rivets or headed fasteners are placed in the reservoir 9 and the cover 12 is secured in place. Air pressure is then forced into the reservoir through the air inlet 16. The air jet at inlet 16 is arranged at such an angle in the wall 11 that the air flow therefrom causes the rivets in the reservoir to whirl in a counterclockwise direction. The centrifugal force drives the rivets around the outer periphery of the reservoir and as they are driven they are impelled, along with the air, toward the opening 11a which is the only outlet in the reservoir. When a rivet approaches the opening head first the pin 27 precludes its passage through the opening 11a whereas when a rivet approaches shank first the pin will serve to guide the shaft into the opening 11a and into the slot of the guide 23.

Preferably (as shown in Fig. 6) the rivet track 20 is provided near the opening therein opposite gap 11a with a flat leaf spring 49 which is mounted on the base 21, the end farther from the opening 11a being slightly raised so that movement of rivets along the track away from the reservoir is uninhibited but that the movement toward the reservoir is prohibited. Movement of the rivets along the rivet track toward the hammer 37 may be occasioned either by gravity or by the vibration of the gun while it is in operation. In this latter event the presence of the leaf spring to act as a catch is particularly important.

Although the foregoing description has necessarily been confined to certain specific uses of my invention, I wish it to be understood that the scope of my patent is not to be defined thereby, but only by the limitations of the appended claims.

I claim:

1. In combination with an air pressure actuated rivet gun having a barrel, a rivet hammer, and a trigger control means, a rivet positioning means slidably mounted on a bracket fixed to the gun, said rivet positioning means comprising a circular rivet reservoir having a rivet propelling air inlet port and an outlet port and a slotted rivet guide track overhanging said outlet port, said inlet port and said outlet port arranged so that inlet air propels the rivets around the circular wall of the reservoir in a path traversing the outlet port, an abutment having a circular contour projecting laterally of the reservoir into said rivet path adjacent the outlet port to cause expulsion of rivet's shank first into the outlet port and thence shank first into the rivet guide track, said track being adapted to receive and convey a rivet expelled from the reservoir to a position in alignment with the rivet hammer, and a manually operable control means operable about a pivot carried by the gun and movable to sequentially engage the rivet positioning means and the trigger to effect retractive movement of said reservoir and track in conjunction with operation of the rivet hammer.

2. In combination with an air pressure actuated rivet gun having a barrel, a rivet hammer, and a trigger control means, a rivet positioning means slidably mounted on a bracket fixed to the gun, said rivet positioning means comprising a circular rivet reservoir having a rivet propelling air inlet port and an outlet port and a slotted rivet guide track overhanging said outlet port, said inlet port being spaced from said outlet port and arranged so that inlet air propels rivets inserted in the reservoir around the circular wall of said reservoir for centrifugal presentment in a path traversing the outlet port, circular abutment means projecting laterally of the reservoir into said rivet path adjacent the outlet port to cause expulsion of rivets shank first into the outlet port and thence shank first into the rivet guide track, said projecting means including a curved surface to guide rivets presented thereto head first back into the reservoir away from the outlet port, said track being constructed and arranged for retraction, including means to receive and convey a rivet expelled from the reservoir to a position in alignment with the rivet hammer, and a manually operable control means positioned adjacent the gun trigger to effect sequential retraction of the rivet positioning means and operation of the trigger.

3. In a device for sequentially positioning fasteners having shank and head portions in conjunction with a pneumatic tool, of a fastener reservoir having a circular wall, cover means for the reservoir, an air inlet formed in said circular wall and connected to a suitable air pressure source, a valve means associated with said inlet for controlled introduction of air into the reservoir, an outlet port formed in the circular wall at a point spaced from the air inlet, a slotted track means associated with the outlet port and positioned to receive fasteners expelled shank first from said outlet, said air inlet being constructed and arranged to direct air under pressure across the outlet port to strike against the circular wall at a point beyond said outlet to effect centrifugal movement of fasteners around the wall and through said outlet, and abutment means positioned at right angles to the reservoir having a curved surface spaced inwardly of the outlet port to deflect fasteners presented head first back into the air stream from said inlet and a curved surface extending into said outlet to direct fasteners presented shank first inwardly of the outlet for entry into the track.

4. In a device for sequentially positioning fasteners having shank and head portions and adapted for mounting on a portable pneumatic tool, of a fastener reservoir having a base, a circular wall extending around the periphery of the base, a cover means parallel to the base, a source of air under pressure, an air inlet formed in the circular wall and connected to said air source for admission of air under pressure and so constructed and arranged as to effect circumferential flow of said air as an air stream around the reservoir wall, a valve means associated with the air inlet for manual control of air into the reservoir, an outlet port extending outwardly of the circular wall constructed and arranged for passage of fasteners presented thereto shank first by said air stream with abutment means carried by the base having a deflecting surface facing inwardly of the reservoir to deflect fasteners presented thereto head first and a cooperating surface facing into the outlet port and spaced therefrom to receive fasteners presented shank first, a fastener-receiving track having parallel flanges spaced apart and positioned over the outlet to receive fasteners passed thereby shank first, and a catch means carried by the track having a springable abutment spaced from the outlet port to prohibit return of fasteners into said outlet port.

5. In a device for uniformly positioning fasteners having shank and head portions, of a fastener reservoir having a circular wall, an air inlet formed in the wall and connected to a suitable source of air under pressure for directing an air stream against said wall at a point spaced forwardly of said inlet as a deflection point for deflecting said air stream around the reservoir wall, a fastener outlet port formed in the reservoir wall at a point spaced between the inlet and said deflection point so constructed and arranged to receive fasteners carried in the air stream and thrown by centrifugal force beyond the air inlet, an abutment adjacent said outlet having oppositely rounded surfaces, one of said rounded surfaces being positioned to face inwardly of the reservoir and the other being positioned to face outwardly of the reservoir to provide for passage of fasteners through the outlet presented so as to strike the outwardly facing surface and rejection of fasteners presented so as to strike the inwardly facing surface, a fastener-receiving means having parallel strips positioned over the outlet port to receive fasteners passed therethrough, and catch means carried by the fastener-receiving means having an abutment facing away from the outlet to prohibit return of fasteners to said outlet port.

6. In a device for uniformly positioning fasteners having shank and head portions, of a fastener reservoir having a base, a peripheral wall, parallel side walls placed at right angles to said peripheral wall, an air inlet formed in the peripheral wall and connected to a suitable source of air under pressure, said air inlet being positioned relative to said peripheral wall to direct an air stream spaced forwardly of said point of inlet for deflection around the peripheral wall, a fastener outlet port formed in the peripheral wall at a point spaced forwardly of the inlet and so constructed and arranged to receive fasteners carried in the air stream and thrown by centrifugal force beyond the point of said air inlet, an abutment extending between said parallel walls adjacent said fastener outlet having oppositely spaced surfaces, one of said surfaces being positioned to face outwardly of the reservoir so as to provide for passage of fasteners through the fastener outlet brought into contact therewith and the other one of said surfaces being positioned to face inwardly of the reservoir to effect rejection of fasteners brought into contact therewith, and fastener-receiving means having a slot formed between parallel strips positioned over the fastener outlet to receive fasteners passed therethrough.

CHARLES J. MELLODGE.

REFERENCES CITED

The following references are of record in the file of this patent:

UNITED STATES PATENTS

| Number | Name | Date |
|---|---|---|
| 380,645 | Dean | Apr. 3, 1888 |
| 565,074 | Goddu | Aug. 4, 1896 |
| 704,098 | Pickles | July 8, 1902 |
| 1,703,458 | Ruff | Feb. 26, 1929 |
| 1,753,499 | Burger | Apr. 8, 1930 |
| 2,069,042 | Marchant | Jan. 26, 1937 |
| 2,123,780 | Howard | July 12, 1938 |
| 2,171,029 | Geldhof | Aug. 29, 1939 |
| 2,255,827 | Snyder | Sept. 16, 1941 |
| 2,304,425 | Semple | Dec. 8, 1942 |
| 2,322,381 | Mueller | June 22, 1943 |
| 2,337,181 | Burkey | Dec. 21, 1943 |
| 2,366,448 | Greene | Jan. 2, 1945 |
| 2,368,847 | Koehler | Feb. 6, 1945 |